(12) United States Patent
Miyake et al.

(10) Patent No.: US 11,466,757 B2
(45) Date of Patent: Oct. 11, 2022

(54) CONTINUOUSLY VARIABLE TRANSMISSION AND TRANSMISSION BELT

(71) Applicant: AISIN CORPORATION, Kariya (JP)

(72) Inventors: Takayuki Miyake, Okazaki (JP); Akira Ochi, Anjo (JP); Wataru Ishihara, Anjo (JP); Junichi Tokunaga, Anjo (JP)

(73) Assignee: AISIN CORPORATION, Kariya (JP)

( * ) Notice: Subject to any disclaimer, the term of this patent is extended or adjusted under 35 U.S.C. 154(b) by 286 days.

(21) Appl. No.: 16/606,086

(22) PCT Filed: May 14, 2018

(86) PCT No.: PCT/JP2018/018604
§ 371 (c)(1),
(2) Date: Oct. 17, 2019

(87) PCT Pub. No.: WO2018/212140
PCT Pub. Date: Nov. 22, 2018

(65) Prior Publication Data
US 2021/0148439 A1    May 20, 2021

(30) Foreign Application Priority Data
May 16, 2017  (JP) .............................. JP2017-097349

(51) Int. Cl.
*F16H 9/18*     (2006.01)
*F16G 5/16*    (2006.01)
(52) U.S. Cl.
CPC    *F16H 9/18* (2013.01); *F16G 5/16* (2013.01)
(58) Field of Classification Search
CPC .................................. F16H 55/56; F16H 9/18
(Continued)

(56) References Cited

U.S. PATENT DOCUMENTS 3,824,867 A * 7/1974 Brooks ............. F16H 61/66245
474/13
3,979,963 A * 9/1976 Goettl ................... F16H 55/566
474/8
(Continued)

FOREIGN PATENT DOCUMENTS

JP          3-72139 U      7/1991
JP       2002-168305 A    6/2002
(Continued)

OTHER PUBLICATIONS

International Search Report for PCT/JP2018/018604 dated Jul. 24, 2018 [PCT/ISA/210].

*Primary Examiner* — Henry Y Liu
(74) *Attorney, Agent, or Firm* — Sughrue Mion, PLLC

(57) ABSTRACT

A continuously variable transmission includes a transmission belt including a plurality of elements and a ring and wound around V-grooves of first and second pulleys, each of the plurality of elements including a body portion having a saddle surface and a pair of pillar portions extended from the body portion so as to be located on both sides in a lateral direction of the saddle surface, and the ring being disposed between the pair of pillar portions of each of the plurality of elements. When one of the first and second pulleys has its minimum groove width, at least a part in a thickness direction of the ring wound around the one of the first and second pulleys protrudes radially outward beyond an outermost circumference of a surface of the V-groove of the one of the first and second pulleys.

13 Claims, 4 Drawing Sheets

(58) Field of Classification Search
USPC .......................................................... 474/8
See application file for complete search history.

(56) References Cited

U.S. PATENT DOCUMENTS

| | | | | |
|---|---|---|---|---|
| 4,061,047 | A * | 12/1977 | Newhouse | F16H 55/56 474/46 |
| 4,371,361 | A * | 2/1983 | Giacosa | F16G 5/16 474/201 |
| 4,432,743 | A * | 2/1984 | Pitoiset | F16H 55/563 474/14 |
| 4,515,575 | A * | 5/1985 | Kinbara | F16H 61/66227 474/11 |
| 4,559,026 | A * | 12/1985 | Pitoiset | F16H 55/563 474/14 |
| 4,564,357 | A * | 1/1986 | Thirion de Briel | F02B 67/06 474/14 |
| 4,813,921 | A * | 3/1989 | Dianda | F02N 3/04 474/133 |
| 4,861,317 | A * | 8/1989 | Brasse | F16H 55/56 474/11 |
| 4,925,432 | A * | 5/1990 | Miyamaru | B60W 10/06 474/11 |
| 5,123,880 | A * | 6/1992 | Sekine | F16H 9/24 474/244 |
| 5,236,401 | A * | 8/1993 | Matsuo | F16G 5/16 474/242 |
| 5,378,199 | A * | 1/1995 | Chyi-Shiun | F16H 61/6625 474/46 |
| 6,123,634 | A * | 9/2000 | Faust | F16H 55/56 474/18 |
| 6,248,035 | B1 * | 6/2001 | Bartlett | F16H 55/56 474/13 |
| 6,270,436 | B1 * | 8/2001 | Reik | F16H 9/14 474/15 |
| 6,648,781 | B1 * | 11/2003 | Fischer | F16H 55/56 474/201 |
| 6,682,450 | B2 * | 1/2004 | Mukai | F16H 55/563 474/15 |
| 7,077,775 | B2 * | 7/2006 | Shiba | F16G 5/16 474/201 |
| 7,980,972 | B1 * | 7/2011 | Starkey | F16H 63/062 474/8 |
| 8,371,972 | B2 * | 2/2013 | Sugitani | F16H 55/56 474/44 |
| 2002/0025872 | A1 * | 2/2002 | Shiba | F16G 5/16 474/242 |
| 2005/0239585 | A1 * | 10/2005 | Nishida | F16H 55/56 474/19 |
| 2006/0089218 | A1 * | 4/2006 | Huang | F16H 35/10 474/17 |
| 2007/0191157 | A1 * | 8/2007 | Kamamoto | B21L 15/005 474/8 |
| 2008/0051235 | A1 * | 2/2008 | Tada | F16G 5/18 474/8 |
| 2009/0082148 | A1 * | 3/2009 | Van Der Leest | F16H 9/125 474/166 |
| 2009/0270208 | A1 * | 10/2009 | Starkey | F16H 63/062 474/11 |
| 2011/0098144 | A1 * | 4/2011 | Van Der Leest | F16H 9/125 474/8 |
| 2011/0152019 | A1 * | 6/2011 | Gantner | F16H 9/24 474/8 |
| 2011/0237376 | A1 * | 9/2011 | Sano | F16G 5/16 474/242 |
| 2012/0100943 | A1 * | 4/2012 | Blanchard | F16H 55/56 474/8 |
| 2013/0079182 | A1 * | 3/2013 | Raasch | F16H 55/44 474/8 |
| 2013/0178316 | A1 * | 7/2013 | Kadokawa | F16H 57/035 474/8 |
| 2014/0335981 | A1 * | 11/2014 | Kadokawa | F16H 55/56 474/8 |
| 2015/0080157 | A1 * | 3/2015 | Sumida | F16H 9/18 474/28 |
| 2016/0053872 | A1 * | 2/2016 | Van Rooij | F16H 9/18 474/8 |
| 2016/0061314 | A1 * | 3/2016 | Kuhl | F16H 57/0489 474/8 |
| 2016/0186846 | A1 * | 6/2016 | Kidokoro | F16H 37/022 474/8 |
| 2018/0023664 | A1 * | 1/2018 | Bransma | F16G 5/18 474/8 |

FOREIGN PATENT DOCUMENTS

JP            5158252 B2     3/2013
WO      2015/177372 A1    11/2015

* cited by examiner

CONTINUOUSLY VARIABLE TRANSMISSION AND TRANSMISSION BELT

CROSS REFERENCE TO RELATED APPLICATIONS

This application is a National Stage of International Application No. PCT/JP2018/018604, filed on May 14, 2018, which claims priority from Japanese Patent Application No. 2017-097349, filed on May 16, 2017.

TECHNICAL FIELD

The present disclosure relates to continuously variable transmissions including a transmission belt having a plurality of elements and a ring holding the plurality of elements together in a ring shape, and transmission belts.

BACKGROUND ART

Conventionally, continuously variable transmissions are known in the art which include a metal V-belt formed by an endless metal belt strap, multiple metal blocks mounted on the belt strap, and a retaining strap having the shape of an endless strap and keeping the metal blocks mounted on the belt strap (see, e.g., Patent Document 1). Each metal block of the metal V-belt has a strap placement groove formed in its upper surface so as to open upward and to allow the belt strap to pass therethrough. The strap placement groove has attachment grooves formed in its both inner side surfaces so as to allow the retaining strap to be attached therein. The retaining strap has the same width along its entire circumference and has a flat plate-shaped lateral section. A flat plate as the retaining strap has holes formed at least at one position in order to facilitate elastic deformation of the flat plate into an arc shape when inserted into the strap placement groove. The retaining strap is mounted in each metal block as both ends of the retaining strap are inserted into the attachment grooves. The retaining strap covers the belt strap passing through the strap placement grooves when the retaining strap is released from an elastically deformed state and has its lateral section returned to the flat plate shape.

RELATED ART DOCUMENTS

Patent Documents

Patent Document 1: Japanese Utility Model Application Publication No. H03-72139 (JP 03-72139 U)

SUMMARY OF DISCLOSURE

In a continuously variable transmission including such a metal V-belt, the speed ratio range can be increased by increasing the maximum winding radius of the metal V-belt around a drive pulley and a driven pulley. However, the invention described in Patent Document 1 is intended to facilitate mounting of the metal blocks on the metal strap, and Patent Document 1 does not describe any specific means for increasing the speed ratio range.

It is an aspect of the present disclosure to increase the speed ratio range of a continuously variable transmission by increasing the maximum winding radius of a transmission belt.

A continuously variable transmission of the present disclosure is a continuously variable transmission that includes a drive-side first pulley, a driven-side second pulley, and a transmission belt including a plurality of elements and a ring and wound around V-grooves of the first and second pulleys, each of the plurality of elements including a body portion having a saddle surface and a pair of pillar portions extended from the body portion so as to be located on both sides in a lateral direction of the saddle surface, and the ring being disposed between the pair of pillar portions of each of the plurality of elements, wherein when one of the first and second pulleys has its minimum groove width, at least a part in a thickness direction of the ring wound around the one of the first and second pulleys protrudes radially outward beyond an outermost circumference of a surface of the V-groove of the one of the first and second pulleys.

In this continuously variable transmission, the ring can be restricted from coming off from each element by the pair of pillar portions when power is transmitted from the first pulley to the second pulley by the transmission belt. Accordingly, at least a part in the thickness direction of the ring wound around one of the first and second pulleys can be made to protrude radially outward beyond the outermost circumference of the surface of the V-groove of the one of the first and second pulleys when the one of the first and second pulleys has its minimum groove width. This can increase the maximum winding radius of the transmission belt around the first pulley and the second pulley, whereby the speed ratio range of the continuously variable transmission can be increased.

DETAILED DESCRIPTION

A mode for carrying out the various aspects of the present disclosure will be described with reference to the accompanying drawings.

Figure 1:
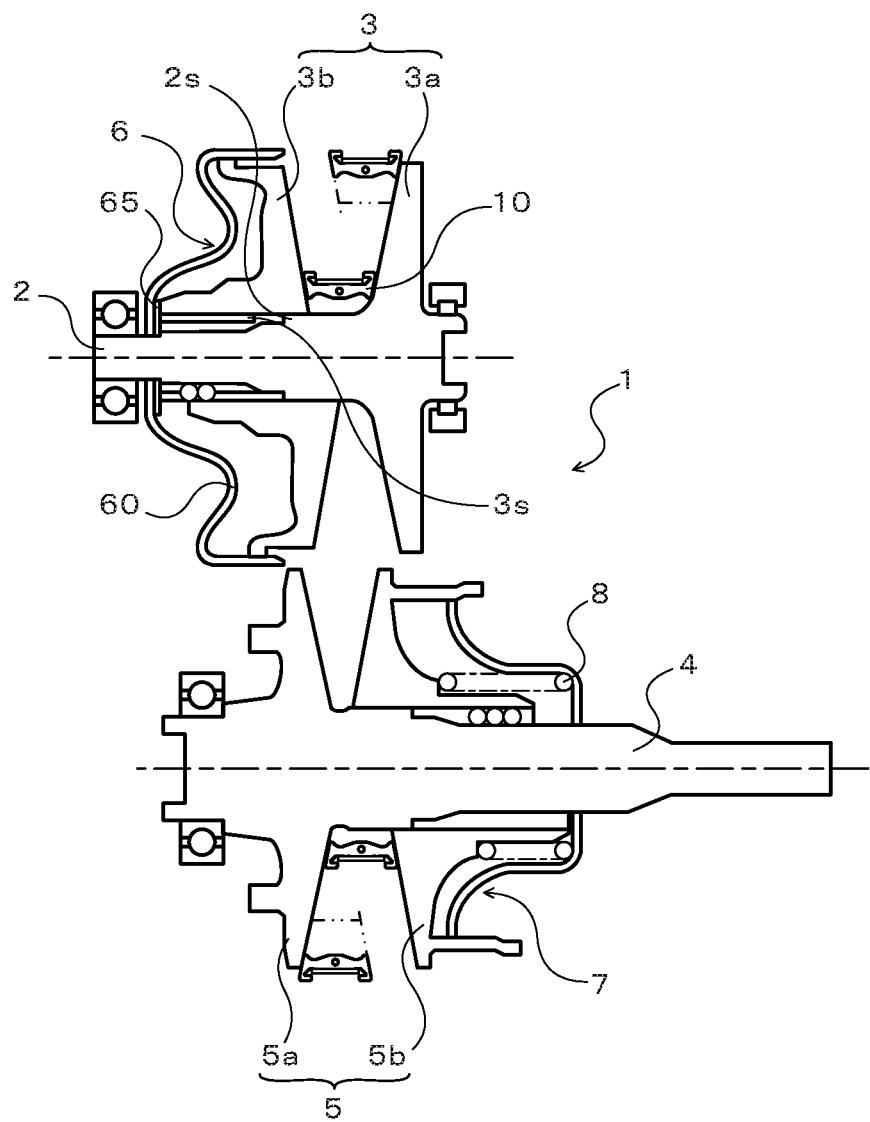
FIG. 1 is a schematic configuration diagram showing an example of a continuously variable transmission of the present disclosure.

FIG. 1 is a schematic configuration diagram of a continuously variable transmission (CVT) 1 of the present disclosure. The continuously variable transmission 1 shown in the figure is mounted on a vehicle and includes a primary shaft (first shaft) 2 serving as a drive rotating shaft, a primary pulley (first pulley) 3 provided on the primary shaft 2, a secondary shaft (first shaft) 4 disposed parallel to the primary shaft 2 and serving as a driven rotating shaft, a secondary pulley (second pulley) 5 provided on the secondary shaft 4, and a transmission belt 10. As shown in the figure, the transmission belt 10 is wound around a pulley groove (V-groove) of the primary pulley 3 and a pulley groove (V-groove) of the secondary pulley 5.

The primary shaft 2 is coupled via a forward/reverse switching mechanism, not shown, to an input shaft (not shown) coupled to a power generation source such as an engine (internal combustion engine) of the vehicle. The primary pulley 3 includes a fixed sheave 3a formed integrally with the primary shaft 2 and a movable sheave 3b supported by the primary shaft 2 via a ball spline etc. so as to be slidable in the axial direction. The secondary pulley 5 includes a fixed sheave 5a formed integrally with the secondary shaft 4 and a movable sheave 5b supported by the secondary shaft 4 via a ball spline etc. so as to be slidable in the axial direction and biased in the axial direction by a return spring 8.

The continuously variable transmission 1 further includes a primary cylinder 6 that is a hydraulic actuator for changing the groove width of the primary pulley 3 and a secondary cylinder 7 that is a hydraulic actuator for changing the groove width of the secondary pulley 5. The primary cylinder 6 is formed behind the movable sheave 3b of the primary pulley 3 and the secondary cylinder 7 is formed behind the movable sheave 5b of the secondary pulley 5. Hydraulic oil is supplied from a hydraulic control device, not shown, to the primary cylinder 6 and the secondary cylinder 7 so as to change the groove width of the primary pulley 3 and the groove width of the secondary pulley 5. The secondary shaft 4 is coupled to drive wheels of the vehicle via a gear mechanism, a differential gear, and drive shafts (all of which are not shown).

In the present embodiment, the primary shaft 2 has a step portion in its opposite end from the engine (the left end in FIG. 1). An annular end plate 65 is interposed between the step portion and a primary piston 60 of the primary cylinder 6 so that the annular end plate 65 can contact the opposite end of the movable sheave 3b of the primary pulley 3 from the engine (the left end in FIG. 1). The primary shaft 2 further has a stopper portion 2s formed so that the stopper portion 2s can contact the ends on the fixed sheave 3a side of spline teeth 3s formed on the inner peripheral surface of the movable sheave 3b.

Figure 2:
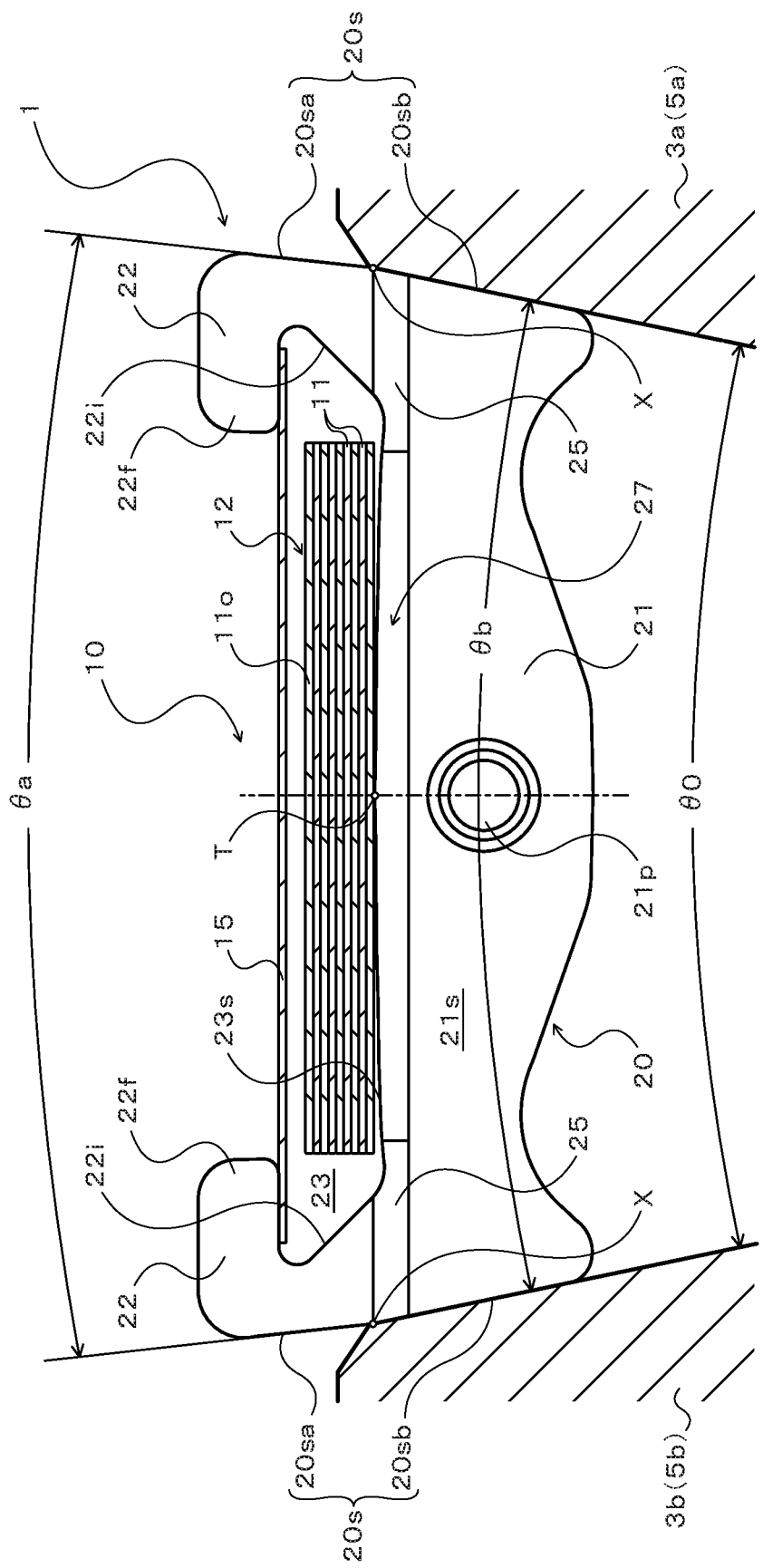
FIG. 2 is a partial sectional view showing a main part of the continuously variable transmission of the present disclosure.

FIG. 2 is a partial sectional view showing the transmission belt 10. As shown in the figure, the transmission belt 10 includes a single laminated ring 12 formed by stacking a plurality of (e.g., nine in the present embodiment) elastically deformable ring materials 11 in the thickness direction (the radial direction of the ring), a single retainer ring 15, and a plurality (e.g., several hundreds) of elements 20 arranged (held together) in a ring shape along the inner peripheral surface of the laminated ring 12.

The plurality of ring materials 11 forming the laminated ring 12 are elastically deformable materials cut out from a steel sheet drum and have been machined to have approximately the same thickness and different predetermined circumferences. The retainer ring 15 is an elastically deformable ring cut out from, e.g., a steel sheet drum and has a thickness that is approximately the same as or is smaller than that of the ring material 11. The retainer ring 15 has an inner circumference that is larger than the outer circumference of the outermost ring material 11o of the laminated ring 12. Accordingly, with the laminated ring 12 and the retainer ring 15 being concentrically disposed (under no load with no tension being applied), there is annular clearance between the outer peripheral surface of the outermost ring material 11o and the inner peripheral surface of the retainer ring 15, as shown in FIG. 2.

Each element 20 is, e.g., an element blanked out from a steel sheet by pressing, and as shown in FIG. 2, has a body portion 21 extending horizontally in the figure, a pair of pillar portions 22 extended in the same direction from both ends of the body portion 21, and a single ring accommodating portion (recessed portion) 23 defined between the pair of pillar portions 22 so as to open toward free ends of the pillar portions 22. The pair of pillar portions 22 are extended outward in the radial direction of the laminated ring 12 (in the direction from the inner circumference of the transmission belt 10 (the laminated ring 12) toward the outer circumference thereof, namely upward in the figure) from both sides in the lateral direction of a saddle surface 23s that is the bottom surface of the ring accommodating portion 23. Each pillar portion 22 has at its free end a hook portion 22f protruding in the lateral direction of the saddle surface 23s.

The pair of hook portions 22f face each other at an interval that is slightly longer than the width of the laminated ring 12 (the ring materials 11) and that is shorter than the width of the retainer ring 15. Each pillar portion 22 of the element 20 has a flat inner surface 22i tilted outward in the radial direction of the laminated ring 12 and away from the saddle surface 23s. A smooth concave surface (e.g., a concave cylindrical surface) is formed between the saddle surface 23s and the inner surface 22i of each pillar portion 22 so as to extend continuously therebetween.

As shown in FIG. 2, the laminated ring 12 is disposed in the ring accommodating portion 23, and the saddle surface 23s of the ring accommodating portion 23 contacts the inner peripheral surface of the laminated ring 12, that is, the innermost ring material 11. The saddle surface 23s has a symmetrical convex shape (crowning shape) having its top T in the middle part in the lateral direction and gently sloping downward in the figure from the top T toward both outer sides in the lateral direction. A centripetal force toward the top T is thus applied to the laminated ring 12 by friction with the saddle surface 23s, so that the laminated ring 12 can be centered. The saddle surface 23s may include a plurality of convex surfaces that are curved outward in the radial direction of the laminated ring 12.

The retainer ring 15 in the elastically deformed state is fitted into the ring accommodating portion 23 through the space between the pair of hook portions 22f. The retainer ring 15 is disposed between the outer peripheral surface of the outermost ring material 11o of the laminated ring 12 and the hook portions 22f of each element 20 so as to surround the laminated ring 12. The retainer ring 15 together with the pair of pillar portions 22 restricts each element 20 from coming off from the laminated ring 12 and restricts the laminated ring 12 from coming off from the elements 20. The plurality of elements 20 are thus held together (arranged) in a ring shape along the inner peripheral surface of the laminated ring 12. In the present embodiment, the retainer ring 15 has one or more openings (long holes), not shown. This facilitates elastic deformation of the retainer ring 15 and allows the retainer ring 15 to be easily attached to the elements 20.

As shown in FIG. 2, the front surface (one surface) of the element 20 has a pair of rocking edge portions (contact regions) 25, a non-contact portion 27, a tapered surface (tilted surface) 21s, and a single protrusion (dimple) 21p. The pair of rocking edge portions 25 are formed on the front surface of the element 20 at an interval in the lateral direction of the saddle surface 23s so that each rocking edge portion 25 extends between a corresponding one of the pillar portions 22 and the body portion 21. The non-contact portion 27 is formed between the pair of rocking edge portions 25 in the lateral direction of the saddle surface 23s. The tapered surface 21s is formed on the front surface (one surface) of the body portion 21 so as to extend from the non-contact portion 27 and the pair of rocking edge portions 25 in the opposite direction to that in which the pillar portions 22 protrude, namely toward the inner circumference of the belt (downward in FIG. 2). The protrusion 21p is formed in the middle part in the lateral direction of the front surface of the body portion 21 and protrudes from the tapered surface 21s.

Figure 3:
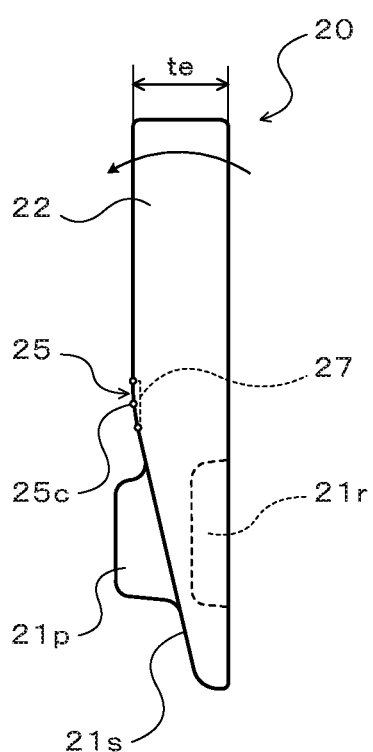
FIG. 3 is a side view of an element included in a transmission belt of the continuously variable transmission of the present disclosure.

In the present embodiment, as shown in FIG. 3, a part of the front surface of the element 20 which is located on the outer circumferential side of the belt with respect to the rocking edge portions 25 and the non-contact portion 27 (mainly the front surfaces of the pillar portions 22) and the rear surface (the other surface) of the element 20 are flat, and the pillar portions 22 of the element 20 have a certain thickness te. As shown in FIG. 3, the tapered surface 21s that is located on the inner circumferential side of the belt with respect to the rocking edge portions 25 and the non-contact portion 27 (in FIGS. 2 and 3, that is located below the rocking edge portions 25 and the non-contact portion 27) is tilted toward the rear surface (back surface) of the element 20 so that the end of the tapered surface 21s which is located farther away from the pillar portions 22 (i.e., which is located on the inner circumferential side of the belt) is located closer to the rear surface (back surface). The rear surface of the element 20 (the body portion 21) has a recessed portion 21r formed so as to be located on the back side of the protrusion 21p. When the transmission belt 10 is assembled, the protrusion 21p of an adjacent element 20 is loosely fitted in the recessed portion 21r.

Each rocking edge portion 25 is a short strip-shaped convex surface, and in the present embodiment, is a cylindrical surface (curved surface) having a predetermined radius of curvature and having a width in the radial direction. Each rocking edge portion 25 includes a contact line 25c (see FIG. 3) where the element 20 contacts its adjacent element 20 and which acts as a fulcrum of rotation of these elements 20. The position of the contact line 25c changes within the range of the rocking edge portion 25 according to the speed ratio γ of the continuously variable transmission 1. In the present embodiment, the radially outer end (the upper end in the figure, namely the end on the pillar portion 22 side) of each rocking edge portion 25 is located on the outer side in the radial direction with respect to the saddle surface 23s, and the radially inner end (the lower end in the figure, namely the end on the tapered surface 21s side) of each rocking edge portion 25 is located on the inner side in the radial direction with respect to the saddle surface 23s.

The non-contact portion 27 is a strip-shaped recessed portion formed in the front surface (one surface) of the body portion 21 so as to open at the saddle surface 23s and to extend in the lateral direction along the saddle surface 23s to separate the pair of rocking edge portions 25 from each other. The surface (bottom surface) of the non-contact portion 27 is recessed more toward the rear surface with respect to the surface of each rocking edge portion 25. The thickness of the saddle surface 23s is therefore smaller than the thickness to of the pillar portions 22. The corners of the non-contact portion 27 (the recessed portion) and the edge portions of the body portion 21 which define the non-contact portion 27 have a round shape by chamfering etc. In the transmission belt 10, forming such a non-contact portion 27 in each element 20 can satisfactorily restrain each element 20 other than its rocking edge portions 25 from contacting its adjacent element 20, that is, can satisfactorily restrain the non-contact portion 27 from contacting its adjacent element 27. As a result, a load can be restrained from being applied from the middle part in the lateral direction of the element 20, which is subjected to a large moment, to its adjacent element 20 and thus the adjacent element 20 can be restrained from being deformed by the load. Durability of the elements 20 can thus be improved.

Each element 20 has a pair of side surfaces 20s formed so that the distance therebetween increases as they extend away from the inner circumferential side of the laminated ring 12 and toward the outer circumferential side thereof (the outer side in the radial direction of the laminated ring 12). As shown in FIG. 2, each side surface 20s includes a first side surface 20sa located on the pillar portion 22 side, namely on the opposite side (outer side) of the pillar portion 22 from the inner surface 22i, and a second side surface 20sb formed so as to be continuous with the first side surface 20sa and located on the inner side in the radial direction of the laminated ring 12 with respect to the first side surface 20sa. In the present embodiment, like the second side surfaces 20sb, the pair of first side surfaces 20sa are formed so that the distance therebetween increases as they extend toward the outer side in the radial direction of the laminated ring 12. This provides satisfactory strength to each pillar portion 22.

As shown in FIG. 2, the angle θb between the pair of second side surfaces 20sb is designed to be approximately equal to the opening angle θ0 of the pulley groove of the primary pulley 3 or the secondary pulley 5 (in the present embodiment, is slightly larger than the design value of the opening angle θ0), and the angle θa between the pair of first side surfaces 20sa is designed to be smaller than the angle θb between the pair of second side surfaces 20sb. The second side surfaces 20sb of the element 20 thus frictionally contact the surface of the pulley groove of the primary pulley 3 or the pulley groove of the secondary pulley 5 and are subjected to a compressing force from the pulley 3, 5, and serve as torque transmission surfaces (flank surfaces) that transmit torque from the primary pulley 3 to the secondary pulley 5 by the friction force. The pair of first side surfaces 20sa, on the other hand, basically do not contact the surface of the pulley groove when torque is transmitted from the primary pulley 3 to the secondary pulley 5 by the transmission belt 10. In the present embodiment, each of the second side surfaces 20sb has protrusions and recesses (a plurality of grooves), not shown, for keeping therein hydraulic oil for lubricating and cooling contact portions between each element 20 and the primary pulley 3 or the secondary pulley 5.

Figure 4:
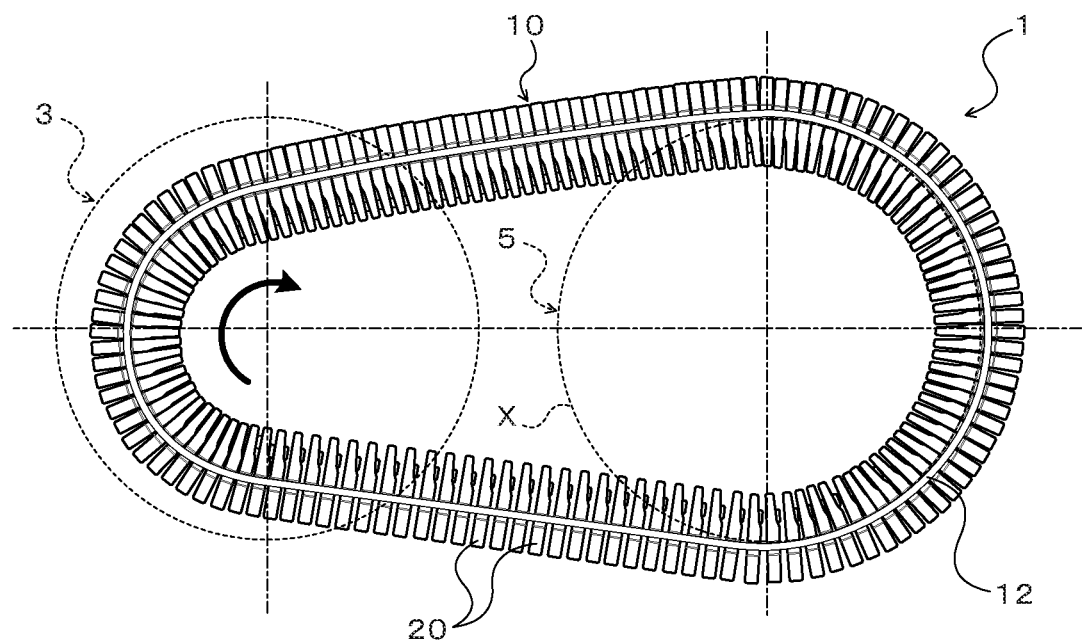
FIG. 4 is a schematic view illustrating operation of the continuously variable transmission of the present disclosure.
Figure 5:
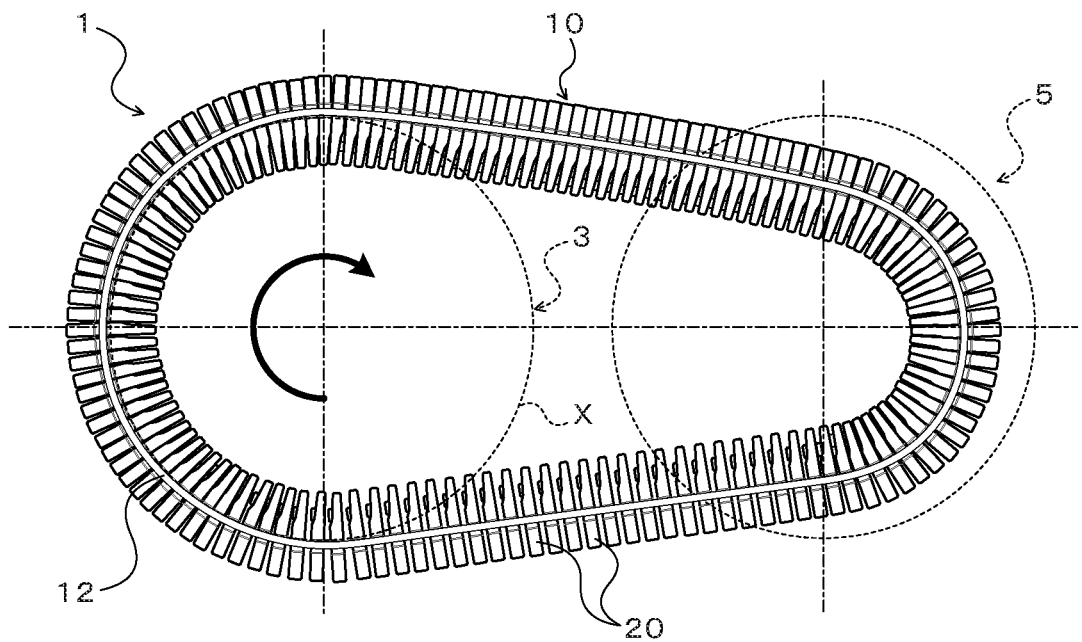
FIG. 5 is a schematic view illustrating operation of the continuously variable transmission of the present disclosure.

Operation of the above continuously variable transmission 1 will be described with reference to FIGS. 2, 4, and 5.

When a vehicle equipped with the continuously variable transmission 1 moves, an oil pressure according to a target speed ratio of the continuously variable transmission 1 determined based on the accelerator operation amount (throttle opening), the vehicle speed, and the engine speed of the vehicle is supplied from a hydraulic control device, not shown, to the primary cylinder 6. Moreover, an oil pressure regulated so as to restrain slipping of the transmission belt 10 is supplied from the hydraulic control device to the secondary cylinder 7. This allows torque transmitted from an engine (power generation source) of the vehicle to the primary shaft 2 via an input shaft and a forward/reverse switching mechanism to be steplessly shifted and output to the secondary shaft 4.

When the vehicle starts moving etc., the movable sheave 3b of the primary pulley 3 is separated from the fixed sheave 3a thereof by adjustment of oil pressures for the primary cylinder 6 and the secondary cylinder 7, and the opposite end of the movable sheave 3b from the engine (the left end in FIG. 1) contacts the end plate 65. The movable sheave 3b is thus restricted from moving with respect to the primary shaft 2 in the direction away from the fixed sheave 3a. Accordingly, when the end of the movable sheave 3b contacts the end plate 65, the pulley groove of the primary pulley 3 has its maximum width, and the pulley groove of the secondary pulley 5 is thus set to its minimum width by the transmission belt 10, whereby the continuously variable transmission 1 has its maximum speed ratio γ.

In the continuously variable transmission 1, even if the ring accommodating portion 23 of the element 20 protrudes radially outward beyond the outer circumference of the primary pulley 3 or the secondary pulley 5 when torque is transmitted from the primary pulley 3 to the secondary pulley 5 by the transmission belt 10, the pair of pillar portions 22 and the retainer ring 15 can restrict the laminated ring 12 from coming off from the element 20. In view of this, the specifications of the continuously variable transmission 1 (the outside diameters of the pulleys 3, 5, the circumference of the transmission belt 10, etc.) are determined so that approximately the entire laminated ring 12 in the thickness direction, which is wound around the secondary pulley 5, protrudes radially outward beyond the outermost circumference X of the surface of the pulley groove of the secondary pulley 5 (the fixed sheave 5a and the movable sheave 5b) as shown in FIGS. 2 and 4 when the pulley groove of the primary pulley 3 has its maximum width and thus the pulley groove of the secondary pulley 5 has its minimum width and the speed ratio γ is maximum. This can increase the maximum winding radius of the transmission belt 10 around the secondary pulley 5, whereby the speed ratio range of the continuously variable transmission 1 can be increased.

On the other hand, when the ends on the fixed sheave 3a side of the spline teeth 3s formed on the inner peripheral surface of the movable sheave 3b contact the stopper portion 2s of the primary shaft 2 by adjustment of oil pressures for the primary cylinder 6 and the secondary cylinder 7, the movable sheave 3b is restricted from moving with respect to the primary shaft 2 in the direction toward the fixed sheave 3a. When the ends of the spline teeth 3s of the movable sheave 3b contact the stopper portion 2s of the primary shaft 2, the pulley groove of the primary pulley 3 has its minimum width, and the pulley groove of the secondary pulley 5 is thus set to its maximum width by the transmission belt 10, whereby the continuously variable transmission 1 has its minimum speed ratio γ. The specifications of the continuously variable transmission 1 of the present embodiment (the outside diameters of the pulleys 3, 5, the circumference of the transmission belt 10, etc.) are determined so that approximately the entire laminated ring 12 wound around the primary pulley 3 protrudes radially outward beyond the outermost circumference X of the surface of the pulley groove of the primary pulley 3 (the fixed sheave 3a and the movable sheave 3b) as shown in FIGS. 2 and 5 when the pulley groove of the primary pulley 3 has its minimum width and thus the pulley groove of the secondary pulley 5 has its maximum width and the speed ratio γ is minimum. This can increase the maximum winding radius of the transmission belt 10 around the primary pulley 3, whereby the speed ratio range of the continuously variable transmission 1 can be increased.

As described above, in the continuously variable transmission 1, when the pulley groove of one of the primary pulley 3 and the secondary pulley 5 has its minimum width, approximately the entire laminated ring 12 in the thickness direction, which is wound around the one of the primary pulley 3 and the secondary pulley 5, protrudes radially outward beyond the outermost circumference X of the surface of the pulley groove of the primary pulley 3 or the secondary pulley 5. This can increase the maximum winding radius of the transmission belt around the primary pulley 3 and the secondary pulley 5, whereby the speed ratio range of the continuously variable transmission 1 can be increased. In the present embodiment, the surfaces of the pulley grooves of the primary pulley 3 and the secondary pulley 5 are conical surfaces, and the outermost circumference X of the surface of each pulley groove is the boundary between the surface (conical surface) of the pulley groove and chamfered portions formed in edge portions of the fixed sheave 3a, 5a and the movable sheave 3b, 5b.

In the present embodiment, the continuously variable transmission 1 is configured so that, when the pulley groove of the primary pulley 3 has its maximum width and thus the pulley groove of the secondary pulley 5 has its minimum width and the speed ratio γ is maximum, each contact line 25c between the elements 20 wound around the secondary pulley 5 is not located radially outside the outermost circumference X of the surface of the pulley groove of the secondary pulley 5, and preferably, is located on the same circumference as either the outermost circumference X or a practical outermost circumference located radially slightly inside the outermost circumference X. Moreover, the continuously variable transmission 1 is configured so that, when the pulley groove of the primary pulley 3 has its minimum width and thus the pulley groove of the secondary pulley 5 has its maximum width and the speed ratio γ is minimum, each contact line 25c between the elements 20 wound around the primary pulley 3 is not located radially outside the outermost circumference X of the surface of the pulley groove of the primary pulley 3, and preferably, is located on the same circumference as either the outermost circumference X or a practical outermost circumference located radially slightly inside the outermost circumference X.

That is, in the continuously variable transmission 1, when the pulley groove of one of the primary pulley 3 and the secondary pulley 5 has its minimum width, the boundary line between a part of the surface of each element 20 which is located on the outer circumferential side of the belt with respect to each rocking edge portion 25 (mainly the front surface of each pillar portion 22) and the rocking edge portion 25 is not located radially outside the outermost circumference X. The contact line 25c between the elements 20 can thus be located radially further outside, and the maximum winding radius of the transmission belt 10 around the secondary pulley 5 can be increased. At the same time, the moment in the pitching direction which acts on the element 20 pushed by its adjacent element 20 via the contact line 25c (see arrow in FIG. 3) can be reduced.

In the continuously variable transmission 1, each of the side surfaces 20s of each element 20 includes the first side surface 20sa that basically does not contact the surface of the pulley groove when torque is transmitted from the primary pulley 3 to the secondary pulley 5 by the transmission belt 10, and the second side surface 20sb that is subjected to a compressing force from the primary pulley 3 and the secondary pulley 5 and serves as a torque transmission surface that transmits torque by a friction force. Accordingly, even when the speed ratio γ of the continuously variable transmission 1 is changed, the contact area between each element 20 and the surface of the pulley groove can be kept constant. This can restrain deterioration in behavior of each element 20 due to a change in load center.

In the continuously variable transmission 1, the pulley groove of the secondary pulley 5 is set to its minimum width by the transmission belt 10 by bringing the end of the movable sheave 3b into contact with the end plate 65 fixed to the primary shaft 2 and thus restricting the movable sheave 3b from moving with respect to the primary shaft 2 in the direction away from the fixed sheave 3a. However, the present disclosure is not limited to this. That is, the pulley groove of the secondary pulley 5 may be set to its minimum width by bringing the end of the movable sheave 5*b* into contact with a stopper portion, not shown, formed in the secondary shaft 4 and thus restricting the movable sheave 5*b* from moving with respect to the secondary shaft 4 in the direction toward the fixed sheave 5*a*. Alternatively, the pulley groove of the secondary pulley 5 may be set to its minimum width by adjusting oil pressures that are supplied to the primary cylinder 6 and the secondary cylinder 7 and thus positioning the movable sheaves 3*b*, 5*b* at predetermined limit positions in the continuously variable transmission 1.

In the continuously variable transmission 1, the pulley groove of the primary pulley 3 is set to its minimum width by bringing the ends of the spline teeth 3*s* of the movable sheave 3*b* into contact with the stopper portion 2*s* of the primary shaft 2 and thus restricting the movable sheave 3*b* from moving with respect to the primary shaft 2 in the direction toward the fixed sheave 3*a*. However, the present disclosure is not limited to this. That is, the pulley groove of the primary pulley 3 may be set to its minimum width by bringing the end of the movable sheave 5*b* into contact with an end plate (or a secondary piston), not shown, fixed to the secondary shaft 4 and thus restricting the movable sheave 5*b* from moving with respect to the secondary shaft 4 in the direction away from the fixed sheave 5*a*. Alternatively, the pulley groove of the primary pulley 3 may be set to its minimum width by adjusting oil pressures that are supplied to the primary cylinder 6 and the secondary cylinder 7 and thus positioning the movable sheaves 3*b*, 5*b* at predetermined limit positions in the continuously variable transmission 1.

In the continuously variable transmission 1, when the pulley groove of one of the primary pulley 3 and the secondary pulley 5 has its minimum width, approximately the entire laminated ring 12 in the thickness direction, which is wound around one of the primary pulley 3 and the secondary pulley 5, protrudes radially outward beyond the outermost circumference X of the surface of the pulley groove of the one of the primary pulley 3 and the secondary pulley 5. However, the present disclosure is not limited to this. That is, when the pulley groove of one of the primary pulley 3 and the secondary pulley 5 has its minimum width, at least the outermost ring material 11*o* of the laminated ring 12 wound around one of the primary pulley 3 and the secondary pulley 5 may protrude radially outward beyond this outermost circumference X or the entire laminated ring 12 may protrude radially outward beyond this outermost circumference X. Alternatively, when the pulley groove of one of the primary pulley 3 and the secondary pulley 5 has its minimum width, about half of the ring materials 11 which are located on the outer circumferential side of the laminated ring 12 wound around one of the primary pulley 3 and the secondary pulley 5 may protrude radially outward beyond this outermost circumference X.

In the continuously variable transmission 1, the pulley groove of the primary pulley 3 has its minimum width when the speed ratio γ is minimum. However, the pulley groove of the primary pulley 3 may have its minimum width when the speed ratio γ of the continuously variable transmission 1 is not minimum. In the continuously variable transmission 1, the pulley groove of the secondary pulley 5 has its minimum width when the speed ratio γ is maximum. However, the pulley groove of the secondary pulley 5 may have its minimum width when the speed ratio γ of the continuously variable transmission 1 is not maximum. In these cases, the continuously variable transmission 1 may be configured so that the primary shaft 2 and the secondary shaft 4 are selectively coupled to the input shaft and the primary shaft 2 and the secondary shaft 4 are selectively coupled to the drive shafts of the vehicle.

In the transmission belt 10 of the continuously variable transmission 1, each element 20 has the pair of hook portions 22*f* and the retainer ring 15 is disposed between the laminated ring 12 and the hook portions 22*f* of the plurality of elements 20. However, the present disclosure is not limited to this. That is, the hook portions 22*f* may be omitted from each element 20 of the transmission belt 10, and the retainer ring 15 may be omitted from the transmission belt 10.

As described above, a continuously variable transmission of the present disclosure is a continuously variable transmission (1) that includes a drive-side first pulley (3), a driven-side second pulley (5), and a transmission belt (10) including a plurality of elements (20) and a ring (12) and wound around V-grooves of the first and second pulleys (3, 5), each of the plurality of elements (20) including a body portion (21) having a saddle surface (23*s*) and a pair of pillar portions (22) extended from the body portion (21) so as to be located on both sides in a lateral direction of the saddle surface (23*s*), and the ring (12) being disposed between the pair of pillar portions (22) of each of the plurality of elements (20). When one of the first and second pulleys (3, 5) has its minimum groove width, at least a part in a thickness direction of the ring (12) wound around the one of the first and second pulleys (3, 5) protrudes radially outward beyond an outermost circumference (X) of a surface of the V-groove of the one of the first and second pulleys (3, 5).

In the continuously variable transmission of the present disclosure, the ring can be restricted from coming off from each element by the pair of pillar portions when power is transmitted from the first pulley to the second pulley by the transmission belt. Accordingly, at least a part in the thickness direction of the ring wound around one of the first and second pulleys can be made to protrude radially outward beyond the outermost circumference of the surface of the V-groove of the one of the first and second pulleys when the one of the first and second pulleys has its minimum groove width. This can increase the maximum winding radius of the transmission belt around the first pulley and the second pulley, whereby the speed ratio range of the continuously variable transmission can be increased.

The first pulley (3) may include a fixed sheave (3*a*) formed integrally with a first shaft (2) and a movable sheave (3*b*) supported by the first shaft (2) so as to be slidable in an axial direction, and the second pulley (5) may have its minimum groove width when the movable sheave (3*b*) is restricted from moving with respect to the first shaft (2) in a direction away from the fixed sheave (3*a*). In this case, the movable sheave (3*b*) may be restricted from moving with respect to the first shaft (2) in the direction away from the fixed sheave (3*a*) as a part of the movable sheave (3*b*) contacts a part of the first shaft (2) or a member (65) fixed to the first shaft (2).

The first pulley (3) may include the fixed sheave (3*a*) formed integrally with the first shaft (2) and the movable sheave (3*b*) supported by the first shaft (2) so as to be slidable in the axial direction, and the first pulley (3) may have its minimum groove width when the movable sheave (3*b*) is restricted from moving with respect to the first shaft (2) in a direction toward the fixed sheave (3*a*). In this case, the movable sheave (3*b*) may be restricted from moving with respect to the first shaft (2) in the direction toward the fixed sheave (3a) as a part (3s) of the movable sheave (3b) of the first pulley (3) contacts a part (2s) of the first shaft (2).

The second pulley (5) may have its minimum groove width when a speed ratio (γ) of the continuously variable transmission (1) is maximum. This can further increase the speed ratio range of the continuously variable transmission.

The first pulley (3) may have its minimum groove width when the speed ratio (γ) of the continuously variable transmission (1) is minimum. This can further increase the speed ratio range of the continuously variable transmission.

The element (20) may include a rocking edge portion (25) that is formed in one of a front surface and a rear surface of the element (20) and that includes a contact line (25c) where the element (20) contacts its adjacent element (20) and which acts as a fulcrum of rotation of these elements (20). When one of the first and second pulleys (3, 5) has its minimum groove width, the contact line (25c) between the elements (20) wound around the one of the first and second pulleys (3, 5) may be located radially inside the outermost circumference (X) of the surface of the V-groove of the one of the first and second pulleys (3, 5). The contact line between the elements can thus be located radially further outside, and the maximum winding radius of the transmission belt around the first pulley and the secondary pulley can be increased. At the same time, the moment in a pitching direction which acts on the element pushed by its adjacent element via the contact line can be reduced.

The element (20) may include a pair of torque transmission surfaces (20sb) that contact the surface of the V-groove, and the torque transmission surfaces (20sb) may not protrude radially outward beyond the outermost circumference (X) of the surface of the V-groove.

The element (20) may include a pair of side surfaces (20s) formed so that a distance therebetween increases as the side surfaces (20s) extend away from an inner circumferential side of the ring (12) and toward an outer circumferential side of the ring (12). Each of the pair of side surfaces (20s) may include a first side surface (20sa) formed on the pillar portion (22) and a second side surface (20sb) formed so as to be continuous with the first side surface (20sa) and located on the inner circumferential side with respect to the first side surface (20sa). An angle (θb) between the pair of second side surfaces (20sb) may be approximately equal to an opening angle (θ0) of the V-grooves of the first and second pulleys (3, 5), and an angle (θa) between the pair of first side surfaces (20sa) may be smaller than the angle (θb) between the pair of second side surfaces (20sb). When power is transmitted from the first pulley to the second pulley by the transmission belt having such elements, the second side surface of the side surfaces of each element can be made to contact the surface of the V-groove, whereas the first side surface located on the pillar portion side can be made not to contact the surface of the V-groove. Accordingly, even when the speed ratio of the continuously variable transmission is changed, the contact area between each element and the surface of the V-groove can be kept constant. This can restrain deterioration in behavior of each element due to a change in load center.

Each of the plurality of elements (20) may further include a pair of hook portions (220 protruding in the lateral direction of the saddle surface (23s) from free ends of the pillar portions (22) and facing each other, and the transmission belt (10) may further include a retainer ring (15) disposed between the ring (12) and the hook portions (220 of the plurality of elements (20).

The outermost circumference (X) of the surface of the V-groove may be a boundary between the surface of the V-groove and a chamfered portion formed in an edge portion of the first or second pulley (3, 3a, 3b, 5, 5a, 5b).

A transmission belt of the present disclosure is a transmission belt (10) including a plurality of elements (20) and a ring (12) and wound around V-grooves of first and second pulleys (3, 5) of a continuously variable transmission (1), each of the plurality of elements (20) including a body portion (21) having a saddle surface (23s) and a pair of pillar portions (22) extended from the body portion (21) so as to be located on both sides in a lateral direction of the saddle surface (23s), and the ring (12) being disposed between the pair of pillar portions (22) of each of the plurality of elements (20), wherein when one of the first and second pulleys (3, 5) has its minimum groove width, at least a part in a thickness direction of the ring (12) wound around the one of the first and second pulleys (3, 5) protrudes radially outward beyond an outermost circumference (X) of a surface of the V-groove of the one of the first and second pulleys (3, 5).

In a continuously variable transmission including such a transmission belt, the maximum winding radius of the transmission belt around the first pulley and the second pulley can be increased, whereby the speed ratio range of the continuously variable transmission can be increased.

It is to be understood that the invention of the present disclosure is not limited in any way to the above embodiment and various modifications can be made without departing from the spirit and scope of the present disclosure. The above embodiment is merely a specific form of the various aspects of the invention described in the section "SUMMARY OF THE DISCLOSURE" and is not intended to limit the elements of the invention described in the section "SUMMARY OF THE DISCLOSURE."

INDUSTRIAL APPLICABILITY

The various aspects of the present disclosure can be used in the manufacturing industries of continuously variable transmissions and transmission belts, etc.

The invention claimed is:

1. A continuously variable transmission that includes a drive-side first pulley, a driven-side second pulley, and a transmission belt including a plurality of elements and a ring and wound around V-grooves of the first and second pulleys, each of the plurality of elements including a body portion having a saddle surface and a pair of pillar portions extended from the body portion so as to be located on both sides in a lateral direction of the saddle surface, and the ring being disposed between the pair of pillar portions of each of the plurality of elements, wherein
when one of the first and second pulleys has its minimum groove width, more than half of the ring in a thickness direction of the ring wound around the one of the first and second pulleys protrudes radially outward beyond an outermost circumference of a surface of the V-groove of the one of the first and second pulleys.

2. The continuously variable transmission according to claim 1, wherein
the first pulley includes a fixed sheave formed integrally with a first shaft and a movable sheave supported by the first shaft so as to be slidable in an axial direction, and
the second pulley has its minimum groove width when the movable sheave is restricted from moving with respect to the first shaft in a direction away from the fixed sheave.

3. The continuously variable transmission according to claim 2, wherein the movable sheave is restricted from moving with respect to the first shaft in the direction away from the fixed sheave as a part of the movable sheave contacts a part of the first shaft or a member fixed to the first shaft.

4. The continuously variable transmission according to claim 1, wherein the first pulley includes a fixed sheave formed integrally with a first shaft and a movable sheave supported by the first shaft so as to be slidable in an axial direction, and the first pulley has its minimum groove width when the movable sheave is restricted from moving with respect to the first shaft in a direction toward the fixed sheave.

5. The continuously variable transmission according to claim 4, wherein the movable sheave is restricted from moving with respect to the first shaft in the direction toward the fixed sheave as a part of the movable sheave of the first pulley contacts a part of the first shaft.

6. The continuously variable transmission according to claim 1, wherein the second pulley has its minimum groove width when a speed ratio of the continuously variable transmission is maximum.

7. The continuously variable transmission according to claim 1, wherein the first pulley has its minimum groove width when a speed ratio of the continuously variable transmission is minimum.

8. The continuously variable transmission according to claim 1, wherein the element includes a rocking edge portion that is formed in one of a front surface and a rear surface of the element and that includes a contact line where the element contacts its adjacent element and which acts as a fulcrum of rotation of these elements, and when one of the first and second pulleys has its minimum groove width, the contact line between the elements wound around the one of the first and second pulleys is located radially inside the outermost circumference of the surface of the V-groove of the one of the first and second pulleys.

9. The continuously variable transmission according to claim 1, wherein the element includes a pair of torque transmission surfaces that contact the surface of the V-groove, and the torque transmission surfaces do not protrude radially outward beyond the outermost circumference of the surface of the V-groove.

10. The continuously variable transmission according to claim 1, wherein the element includes a pair of side surfaces formed so that a distance therebetween increases as the side surfaces extend away from an inner circumferential side of the ring and toward an outer circumferential side of the ring, each of the pair of side surfaces includes a first side surface formed on the pillar portion and a second side surface formed so as to be continuous with the first side surface and located on the inner circumferential side with respect to the first side surface, and an angle between the pair of second side surfaces is approximately equal to an opening angle of the V-grooves of the first and second pulleys, and an angle between the pair of first side surfaces is smaller than the angle between the pair of second side surfaces.

11. The continuously variable transmission according to claim 1, wherein each of the plurality of elements further includes a pair of hook portions protruding in the lateral direction of the saddle surface from free ends of the pillar portions and facing each other, and the transmission belt further includes a retainer ring disposed between the ring and the hook portions of the plurality of elements.

12. A continuously variable transmission that includes a drive-side first pulley, a driven-side second pulley, and a transmission belt including a plurality of elements and a ring and wound around V-grooves of the first and second pulleys, each of the plurality of elements including a body portion having a saddle surface and a pair of pillar portions extended from the body portion so as to be located on both sides in a lateral direction of the saddle surface, and the ring being disposed between the pair of pillar portions of each of the plurality of elements, wherein when one of the first and second pulleys has its minimum groove width, at least a part in a thickness direction of the ring wound around the one of the first and second pulleys protrudes radially outward beyond an outermost circumference of a surface of the V-groove of the one of the first and second pulleys, and the outermost circumference of the surface of the V-groove is a boundary between the surface of the V-groove and a chamfered portion formed in an edge portion of the first or second pulley.

13. A transmission belt including a plurality of elements and a ring and wound around V-grooves of first and second pulleys of a continuously variable transmission, each of the plurality of elements including a body portion having a saddle surface and a pair of pillar portions extended from the body portion so as to be located on both sides in a lateral direction of the saddle surface, and the ring being disposed between the pair of pillar portions of each of the plurality of elements, wherein when one of the first and second pulleys has its minimum groove width, more than half of the ring in a thickness direction of the ring wound around the one of the first and second pulleys protrudes radially outward beyond an outermost circumference of a surface of the V-groove of the one of the first and second pulleys.

* * * * *